United States Patent
Yamashiro et al.

(10) Patent No.: US 7,035,483 B2
(45) Date of Patent: Apr. 25, 2006

(54) IMAGE SEARCH APPARATUS

(75) Inventors: Yoshihide Yamashiro, Osaka (JP); Seiji Hashimoto, Osaka (JP); Michihiro Fujiyama, Kyoto (JP); Hidetoshi Yamada, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 621 days.

(21) Appl. No.: 10/103,822

(22) Filed: Mar. 25, 2002

(65) Prior Publication Data

US 2002/0141617 A1 Oct. 3, 2002

(30) Foreign Application Priority Data

Mar. 28, 2001 (JP) .............................. 2001-093389

(51) Int. Cl.
*G06K 9/00* (2006.01)
*G06K 9/46* (2006.01)

(52) U.S. Cl. ..................................... 382/318; 382/192

(58) Field of Classification Search ........ 382/115–127, 382/100, 103, 192, 307, 318, 236; 348/61, 348/143, 700, 152–156; 340/5.2
See application file for complete search history.

(56) References Cited

U.S. PATENT DOCUMENTS 5,937,092 A 8/1999 Wootton et al. ............ 382/192

FOREIGN PATENT DOCUMENTS

| GB | 2 077 014 | 12/1981 |
| GB | 2 150 724 | 7/1985 |
| GB | 2 183 878 | 6/1987 |
| GB | 2 249 420 | 5/1992 |
| JP | 05-014891 | 1/1993 |
| JP | 09-026472 | 1/1997 |
| JP | 09-149370 | 6/1997 |
| JP | 2000-059762 | 2/2000 |

OTHER PUBLICATIONS

Search Report dated Dec. 20, 2002.

*Primary Examiner*—Duy M. Dang
(74) *Attorney, Agent, or Firm*—Westerman, Hattori, Daniels & Adrian, LLP (57) ABSTRACT

An image search apparatus includes a hard disk. A plurality of images photographed by a surveillance camera are recorded on the hard disk with luminance information. When an arbitrary image is selected as a reference image from among the plurality of images recorded on the hard disk, and an arbitrary area of the reference image is designated as a search area, a CPU calculates a difference value of the luminance information of the search area between the reference image and each of other images. Furthermore, the CPU specifies an image in which the calculated difference value exceeds a threshold value from among the other images, and the specified image is displayed on the display.

5 Claims, 11 Drawing Sheets

[IMAGE FILE Ft]

| SOI | START OF IMAGE FILE |
|---|---|
| APPn | APPLICATION MARKER SEGMENT |
| DQT | QUANTIZATION TABLE |
| DHT | HUFFMAN TABLE |
| DRI | RESTART INTERVAL |
| SOF | FRAME HEADER |
| SOS | SCAN HEADER |
| Coded DATA | COMPRESSED IMAGE DATA |
| EOI | END OF IMAGE FILE |

IMAGE SEARCH APPARATUS

BACKGROUND OF THE INVENTION

1. Field of the Invention

The present invention relates to an image search apparatus applied to a surveillance camera system. More specifically, the present invention relates to an image search apparatus for searching a desired image from among a plurality of images recorded on a recording medium.

2. Description of the Prior Art

In a conventional such a kind of surveillance camera system, an arbitrary area of a surveillance image (live image) is set as an surveillance area, and a chronological change of a luminance level at the surveillance area is determined. An alarm is generated at a time an amount of the change between frames exceeds a threshold value. Furthermore, the surveillance image is recorded on an image recording apparatus such as a hard disk recorder or a VCR (Video Cassette Recorder) so as to be confirmed after that.

However, in the prior art, when searching for the surveillance image at a time the alarm was generated from among a plurality frames of the surveillance images recorded, there is a need to confirm each frame of surveillance image by the naked eye (i.e. manually), and therefore, it is too much troublesome.

Furthermore, even if there occurs a suspicious movement at an area other than the surveillance area, and there occurs a significant change in the luminance level, the alarm is not generated. It is more troublesome and difficult to search for an image in which the suspicious movement occurs from among the images in which the alarm is not generated. In addition, in a prior art, since the alarm is generated at a time an amount of change in the luminance level between the adjacent two frames exceeds the threshold value, no alarm might be generated in a case the luminance level of the surveillance image gradually changes. Thereupon, there is an occasion that the suspicious movement occurring in the surveillance area may be missed out in reproducing.

SUMMARY OF THE INVENTION

Therefore, it is a primary object of the present invention to provide a novel image search apparatus.

Another object of the present invention is to provide an image search apparatus capable of surely and easily searching a desired image from among a plurality of images recorded on a recording medium.

An image search apparatus for searching a desired image signal from among a plurality of image signals comprises: a designator for designating as a search area an arbitrary area of a display image based on any one of the plurality of image signals; a comparator for comparing luminance information corresponding to the search area between a reference image signal and another image signal included in the plurality of image signals; and a specifier specifying as the desired image signal an image signal in which a comparison result of the comparator satisfies a predetermined condition from among the other mage signals.

The designator designates as the search area the arbitrary area of the display image based on any one of the plurality of image signals. The comparator compares the luminance information corresponding to a search area between the reference image signal and other image signals each of which is included in the plurality of image signals. The specifier specifies as the desired image signal the image signal in which the comparison result of the comparator satisfies the predetermined condition. Thus, the desired image can be searched surely and easily.

In a case the comparator calculates a difference of the luminance information, the predetermined condition includes a condition that the difference exceeds the threshold value. Herein, if the threshold value is arbitrarily set, it is possible to change a sensitivity of the search.

If the reference image signal is arbitrarily selected from among the plurality of image signals, it is possible to improve flexibility of the search.

Preferably, a plurality of luminance information respectively corresponding to a plurality of areas constituting the display image are related to the plurality of image signals, respectively, and the designator arbitrarily designates the search area from the plurality of areas. Therefore, it is possible to shorten a time required for searching.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
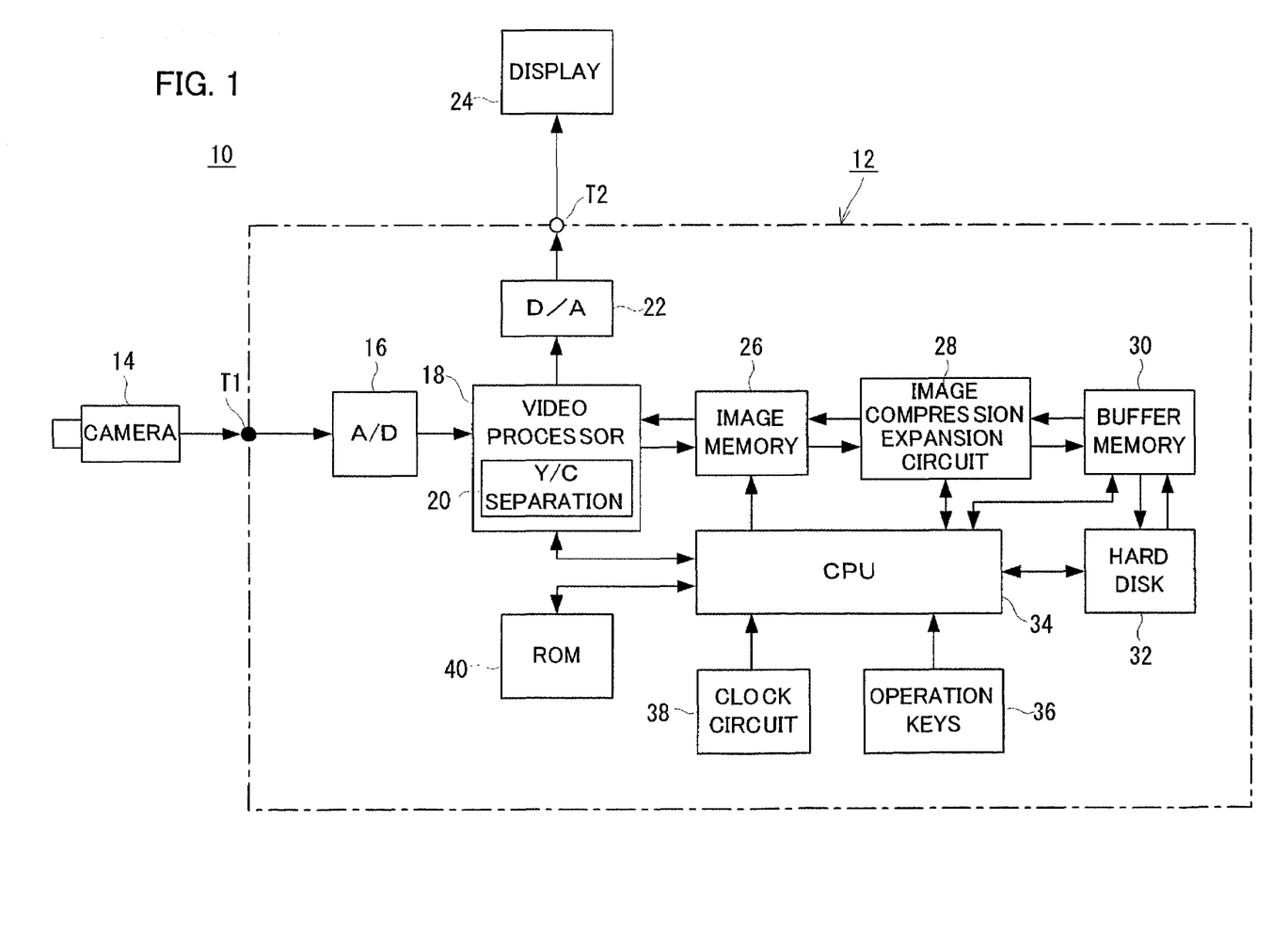
FIG. 1 is a block diagram schematically showing a configuration of one embodiment of the present invention.

Referring to FIG. 1, a surveillance camera system 10 of this embodiment includes an image search apparatus 12. The image search apparatus 12 records onto a hard disk 32 a still image of an object photographed by a surveillance camera 14 at predetermined intervals, and reproduces the still image from the hard disk 32. The image search apparatus 12 also has a function to search a desired still image from among the recorded still images.

An analog image signal outputted form the surveillance camera 14 is inputted to the image search apparatus 12 via an input terminal T1. The inputted image signal is converted to digital image data It (t: an index indicative of time) by the A/D converter 16, and the converted image data It is inputted to a video processor 18. The video processor 18 performs predetermined processes such as filtering and etc. on the inputted image data It so as to output the processed image data It from an output terminal T2 to a display 24 via a D/A converter 22. Thus, a real time motion image of the object is displayed on the display 24.

Furthermore, the image data It processed by the video processor 18 is stored in an image memory 26 at predetermined intervals, and then, applied to an image compression expansion circuit 28. The image compression expansion circuit 28 compresses the applied image data It by complying with a JPEG format to create an image file Ft shown in FIG. 2. The generated image file Ft is temporarily accumulated in a buffer memory 30, and then, recorded in the hard disk 32.

Figure 2:
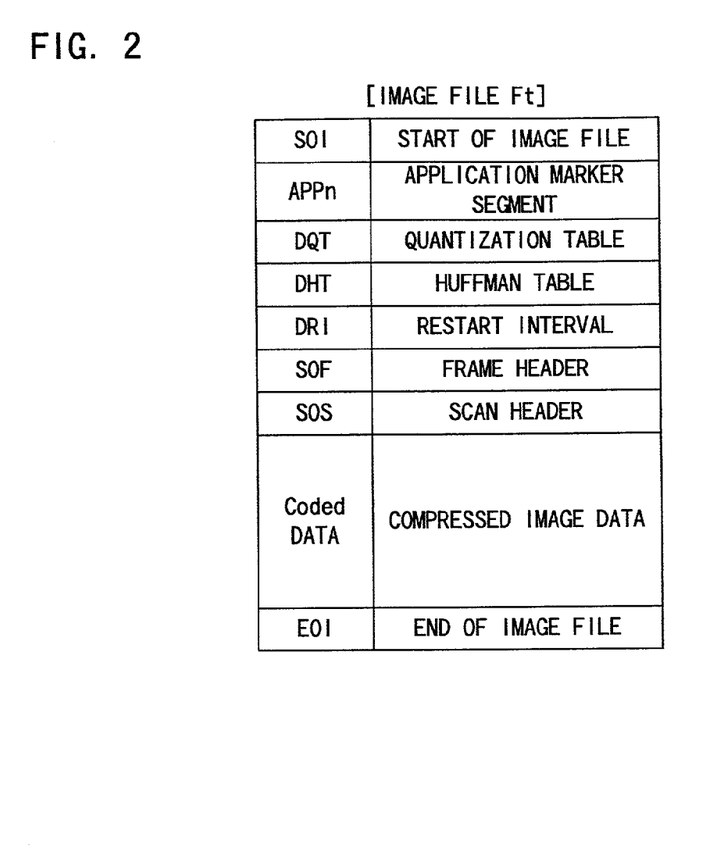
FIG. 2 is an illustrative view showing a file format of an image file.

Referring to FIG. 2, the image file Ft starts from "SOI" of a start marker. After the "SOI", an "APPn" being a marker of an application marker segment, a "DQT" being a marker of a quantization table, a "DHT" being a marker of a Huffman coding table, a "DRI" being a marker of a restart interval, a "SOF" being a marker of a frame header, and a "SOS" being a marker of a scan header are attached in this order. Compressed image data is attached following the scan header "SOS", and an "EOI" of an end marker is attached at the tail end.

Among these, the "APPn" is an arbitrary marker, and time information indicative of a time the image file Ft is created, i.e. a photographed time t and luminance data St described later are recorded on the application marker segment in this embodiment. It is noted that since the "APPn" complies with a well-known Exif (Exchange image File format) format or a DCF (Design rule for Camera File system) format, a detailed description is omitted. Furthermore, since markers other than the "APPn" and the compressed image data comply with the JPEG format, a detailed description about this is also omitted.

Figure 3:
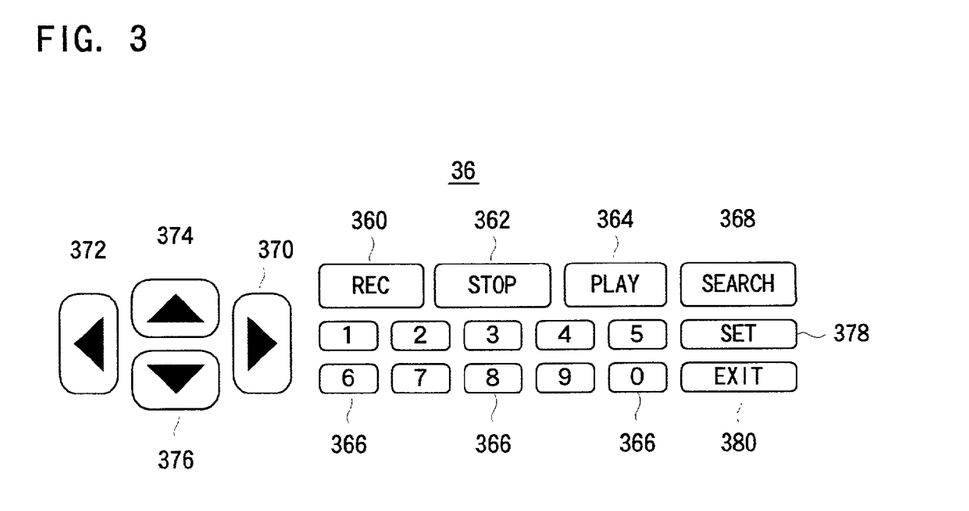
FIG. 3 is an illustrative view showing one example of operation keys.

Such the series of operations from inputting the still image signal of the object to recording the image file Ft is controlled by a CPU 34. More specifically, when a REC key 360 constituting operation keys 36 is pressed, the CPU 34 applies to the video processor 18, the image memory 26, the image compression expansion circuit 28, the buffer memory 30 and the hard disk 32 a timing signal for controlling an operation thereof. The video processor 18, the image memory 26, the image compression expansion circuit 28, the buffer memory 30 and the hard disk 32 are operated in response to the timing signal, and therefore, a series of recording operations is executed. It is noted when a STOP key 362 constituting the operation keys 36 is pressed, the CPU 34 stops the recording operation.

Furthermore, the CPU 34 is connected with a clock circuit 38 for counting a current time. The CPU 34 writes the photographed time to the application marker segment on the basis of the time information applied from the clock circuit 38.

Furthermore, the CPU 34 is inputted with the luminance data St generated by the video processor 18. Specifically, the video processor 18 is provided with an Y/C separation circuit 20 for extracting a luminance component (Y component) from the image data It. The Y/C separation circuit 20 generates luminance data St corresponding to the extracted luminance component so as to be inputted to the CPU 34. The CPU 34 writes the inputted luminance data St to the application marker segment.

Figure 4:
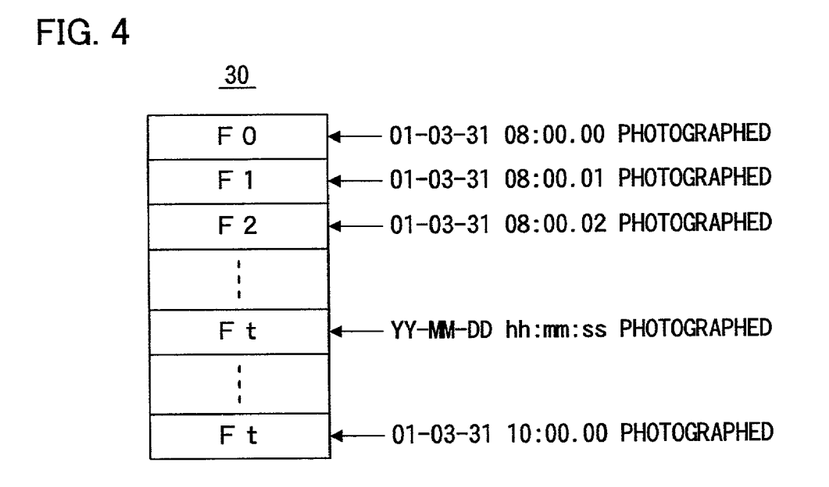
FIG. 4 is an illustrative view showing a recording state of a hard disk.
Figure 5:
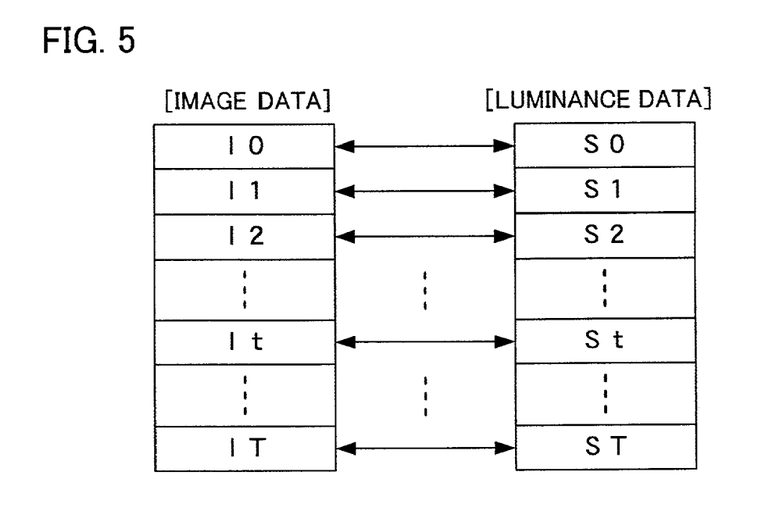
FIG. 5 is an illustrative view showing relations between image data and luminance data.

Referring to FIG. 4, the hard disk 32 is recorded with T+1 of image files Ft (t=0,1,2, . . . ,T) in the order of the photographed time t. Furthermore, the image data It and the luminance data St constituting each image file Ft are related with each other as shown in FIG. 5.

Figure 6:
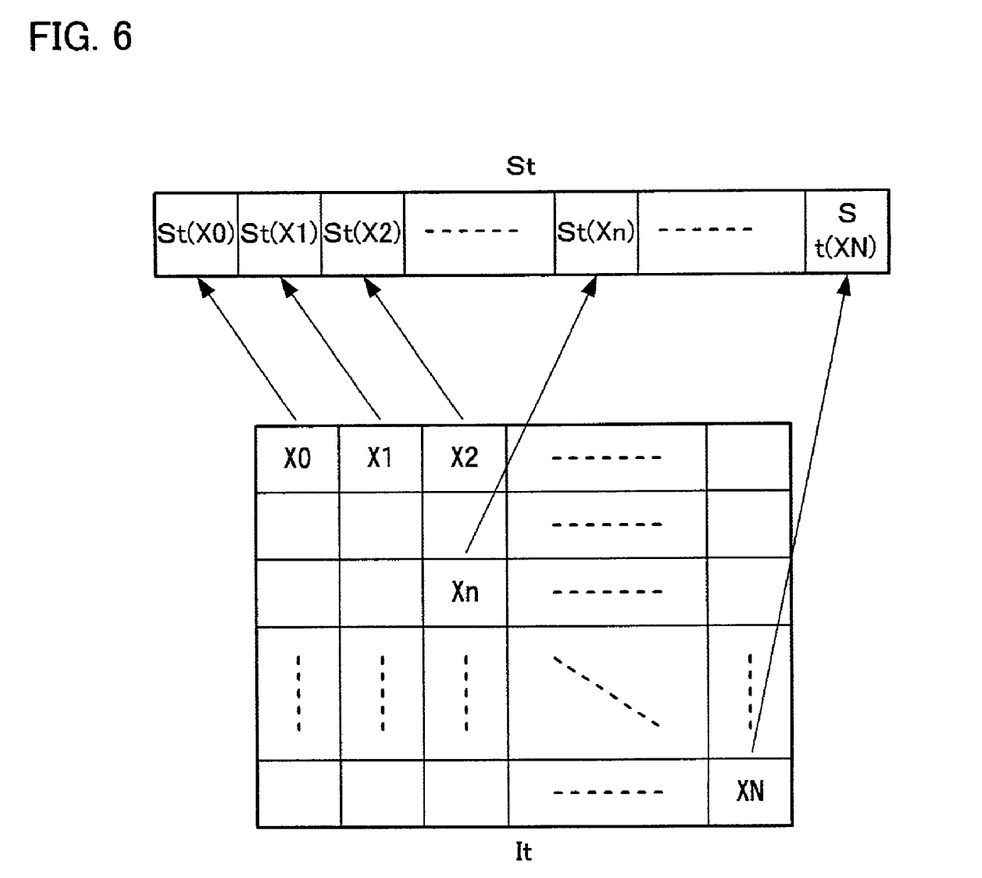
FIG. 6 is an illustrative view showing relations between arbitrary image data and luminance data.

Referring to FIG. 6, each luminance data St is formed by N+1 of data St (Xn) (n=0,1,2, . . . ,N). A whole image area (a whole surveillance area by the surveillance camera 14) represented by the image data It is divided into N+1 of unit image areas Xn (n=0,1,2, . . . ,N) in a matrix form, and the data St (Xn) has an average value of the luminance component included in the unit image area Xn. It is noted that the luminance data St is represented by 8 bits in this embodiment.

The image file Ft thus recorded on the hard disk 32 can be reproduced in an image reproducing mode. When a PLAY key 364 constituting the operation keys 36 is pressed, the CPU 34 shifts to the image reproducing mode, and sequentially transfers the image file Ft from the hard disk 32 to the buffer memory 30. It is noted that it is possible to arbitrarily designate from which image file Ft the reproduction is started in the image reproducing mode. The designation is performed by inputting the photographed time t of the image file Ft to be firstly reproduced utilizing the ten keys 366 from "0" to "9" constituting the operation keys 36.

The image file Ft stored in the buffer memory 30 is expanded to the image data It by the image compression expansion circuit 28. The expanded image data It is temporarily stored in the image memory 26, and then, applied to the D/A converter 22 through the video processor 18. The D/A converter 22 converts the inputted image data to an analog image signal so as to output the converted analog image signal to the display 24 through the output terminal T2. Therefore, a reproduced image of the object is displayed on the display 24. It is noted when the STOP key 362 is pressed, the CPU 34 stops the series of reproducing operations so as to escape the image reproducing mode.

Meanwhile, the image search apparatus 12 of this embodiment has, as described above, a function to search the desired image file Ft from among the plurality of image files Ft recorded on the hard disk 32. The search of the image file Ft is performed in an image search mode. When a SEARCH key 368 constituting the operation keys 36 is pressed, the CPU 34 shifts to the image search mode so as to display a screen shown in FIG. 7 on the display 24 (strictly speaking, the video processor 18 is controlled so as to perform such the display).

Figure 7:
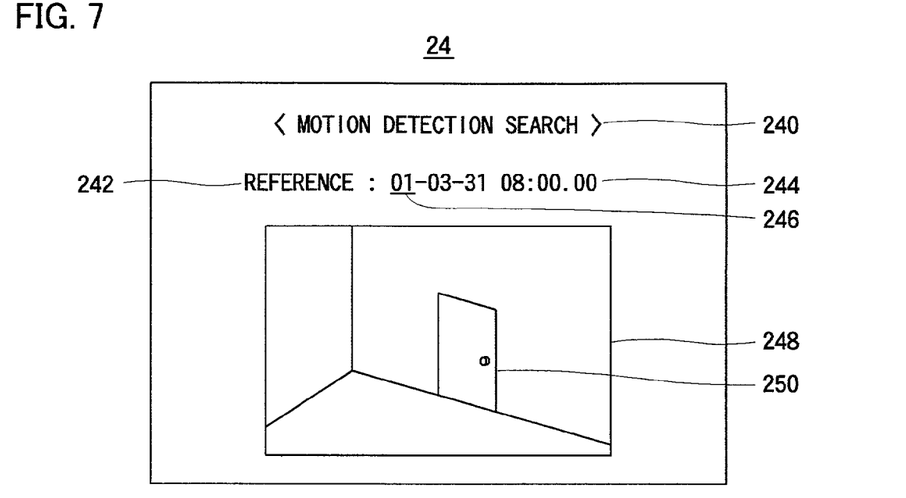
FIG. 7 is an illustrative view showing a display screen of a display in selecting a reference image.

As shown in FIG. 7, a character string 240 of "<MOTION DETECTION SEARCH>" indicating that the CPU 34 shifts to the image search mode is displayed at the upper part of the screen. A character string 242 of "REFERENCE" is displayed below the character string 240, and a field 244 for inputting an arbitrary time (specifically, "year", "month", "date", "time", "minute" and "second") is displayed at the right of the character string 242. Furthermore, a cursor 246 of an under bar form is displayed such that one of the "year", the "month", the "date", the "time", the "minute" and the "second" is pointed out.

The cursor 246 moves right and left within the field 244 in response to operations of a right arrow key 370 or a left arrow key 372 constituting the operation keys 36. Arbitrary numerical values are inputted to the parts corresponding to the "year", the "month", the "date", the "time", the "minute" and the "second" by moving the cursor 372 and by operating an up arrow key 374, a down arrow key 376 or the ten keys 366. It is noted that according to FIG. 7, the time of 01-03-31 08:00.00 is inputted to the field 244.

When the arbitrary time t is thus inputted into the field 244, the CPU 34 displays as a reference image 248 an image photographed at the time t at the lower part of the field 244. More specifically, the CPU 34 reads out an image file Ft corresponding to the time t from the hard disk 32, and controls the buffer memory 30, the image compression expansion circuit 28, the image memory 26 and the video processor 18 so as to display the reference image 248 based on the read image file Ft. Accordingly, in FIG. 7, an image photographed near a door 250 in a room at a time of 01-03-31 08:00.00 is displayed as the reference image 248.

Figure 8:
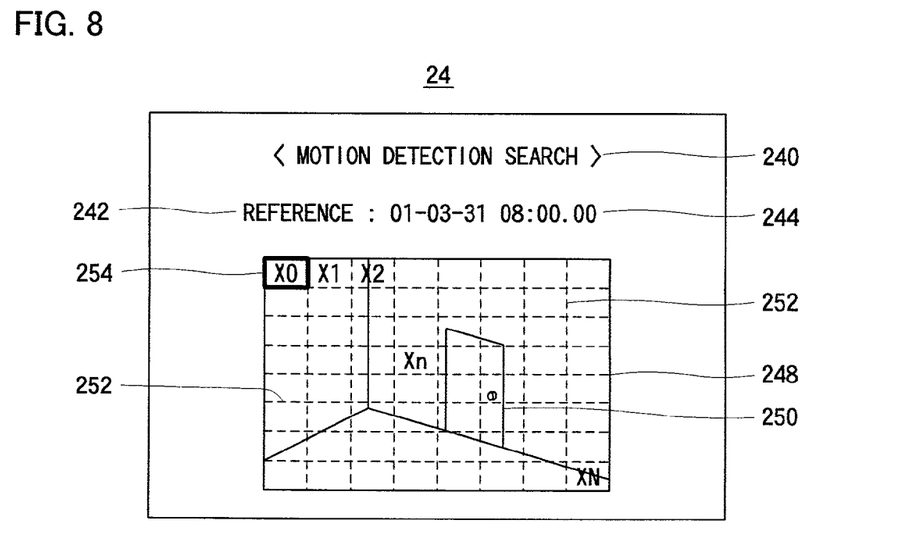
FIG. 8 is an illustrative view showing the display screen of the display after selecting the reference image.

When a SET key 378 constituting the operation keys 36 is pressed in a display state of FIG. 7, the screen display of the display 24 shifts form FIG. 7 to FIG. 8. Specifically, the display of the cursor 246 is deleted from the screen, and section lines 252 of a grid form to section an whole area of the reference image 248 into unit image areas X0~XN are displayed. It is noted that the reference image 248 is divided into eight in each of a horizontal direction and a vertical direction. Thus, the reference image 248 is sectioned to 64 of unit image areas Xn (n=0,1,2, . . . , 63). Furthermore, a unit image area X0 located at the upper left among respective unit image areas Xn is displayed with a heavy-line frame 254 of a rectangle form.

Figure 9:
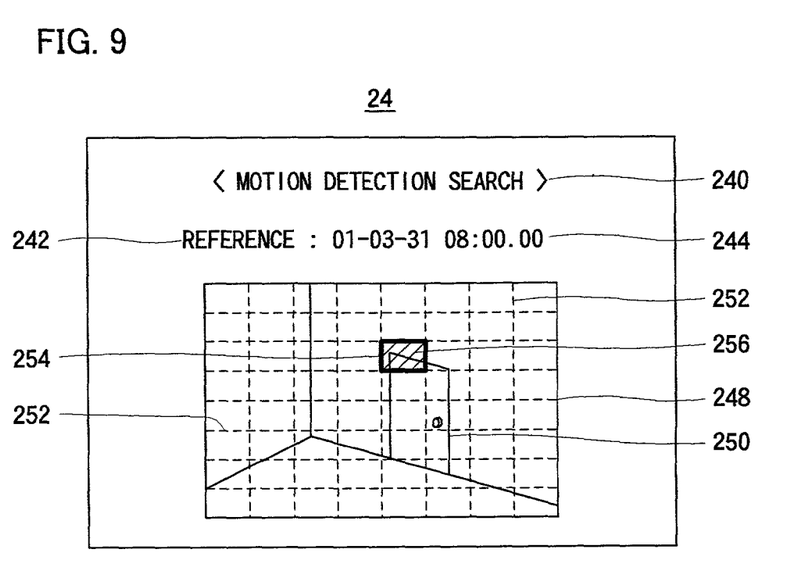
FIG. 9 is an illustrative view showing the display screen of the display in selecting a search area.

The heavy-line frame 254 is moved to an arbitrary unit image area Xn by operating the arrow keys 370 to 374 constituting the operation keys 36. When the SET key 378 is pressed in a state that the heavy-line frame 254 is moved to the arbitrary unit image area Xn, a hatched pattern 256 is displayed within the heavy-line frame 254 as shown in FIG. 9. The hatched pattern 256 is a mark indicating that the unit image area Xn is designated as a search area.

Figure 10:
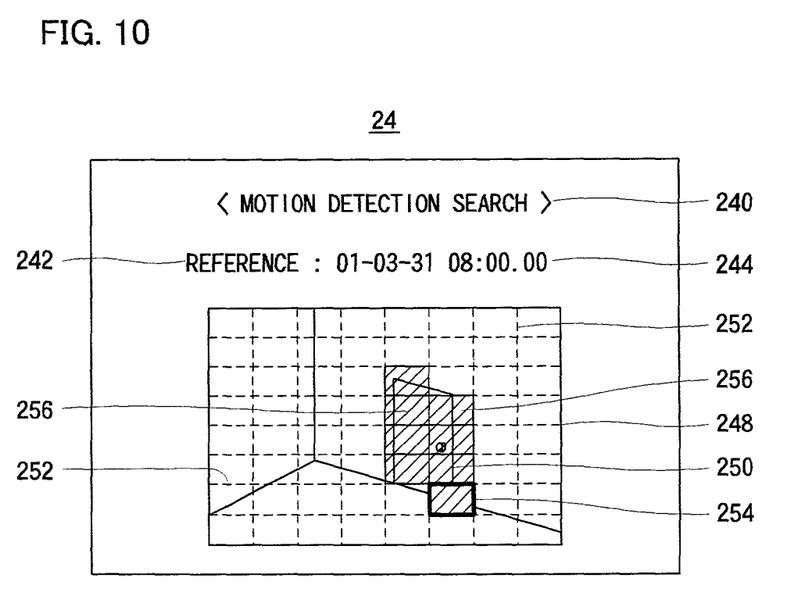
FIG. 10 is an illustrative view showing the display screen of the display in a process of selecting the search areas.
Figure 11:
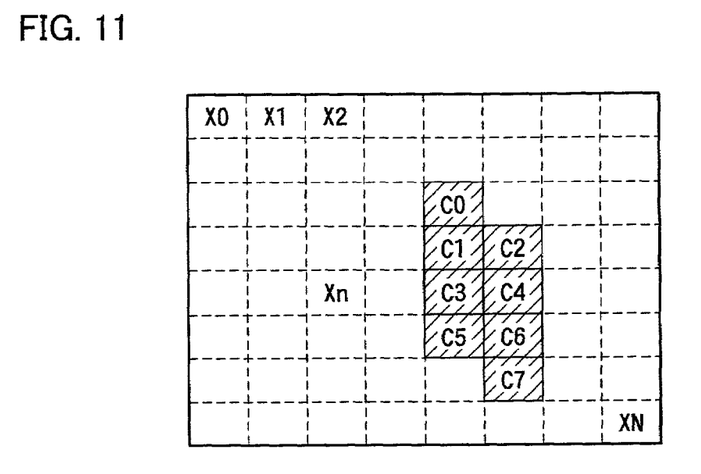
FIG. 11 is an illustrative view showing a state that numbers are assigned to the selected search areas.

Referring to FIG. 10, the search area 256 can be designated in plural in the same process as the above description. According to FIG. 10, most of the door 250 is included by the eight unit image areas Xn designated to be the search area 256. At this time, the numbers C0 to C7 are assigned to respective search areas 256 in the order of designating as shown in FIG. 11.

Figure 12:
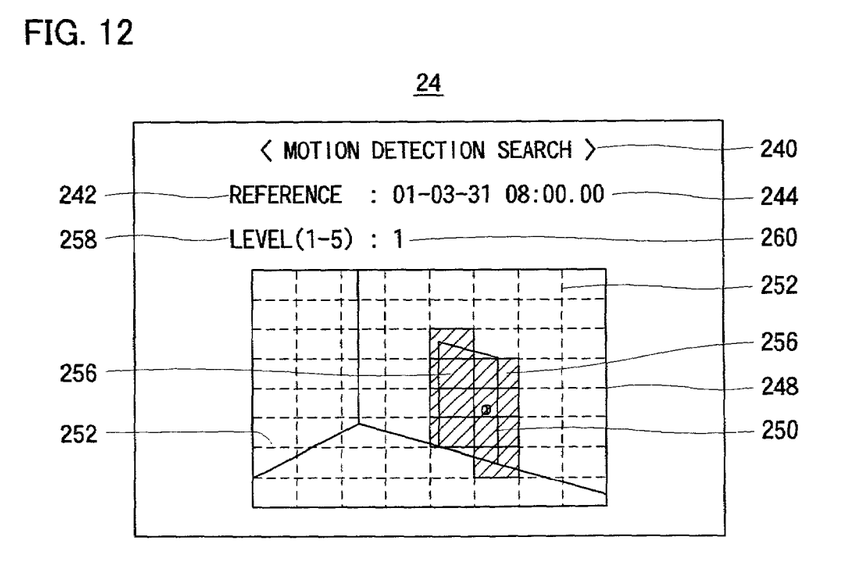
FIG. 12 is an illustrative view showing the display screen of the display after the search areas have been selected.

When an EXIT key 380 constituting the operation keys 36 is pressed, after designating the arbitrary unit image area Xn as the search area 256, the display of the display 24 shifts from FIG. 10 to FIG. 12. Specifically, the display of the heavy-line frame 254 is deleted from the screen, and a character string 258 of "LEVEL (1–5):" is displayed between the character string 242 of "REFERENCE" and the reference image 248, and a field 260 for inputting an arbitrary value within the range "1" to "5" is displayed at the right of the character string 258. The numerical input to the field 260 is performed by operating the up arrow key 374 or the down arrow key 376 constituting the operation keys 36 or the ten keys 366 of "1" to "5".

Figure 13:
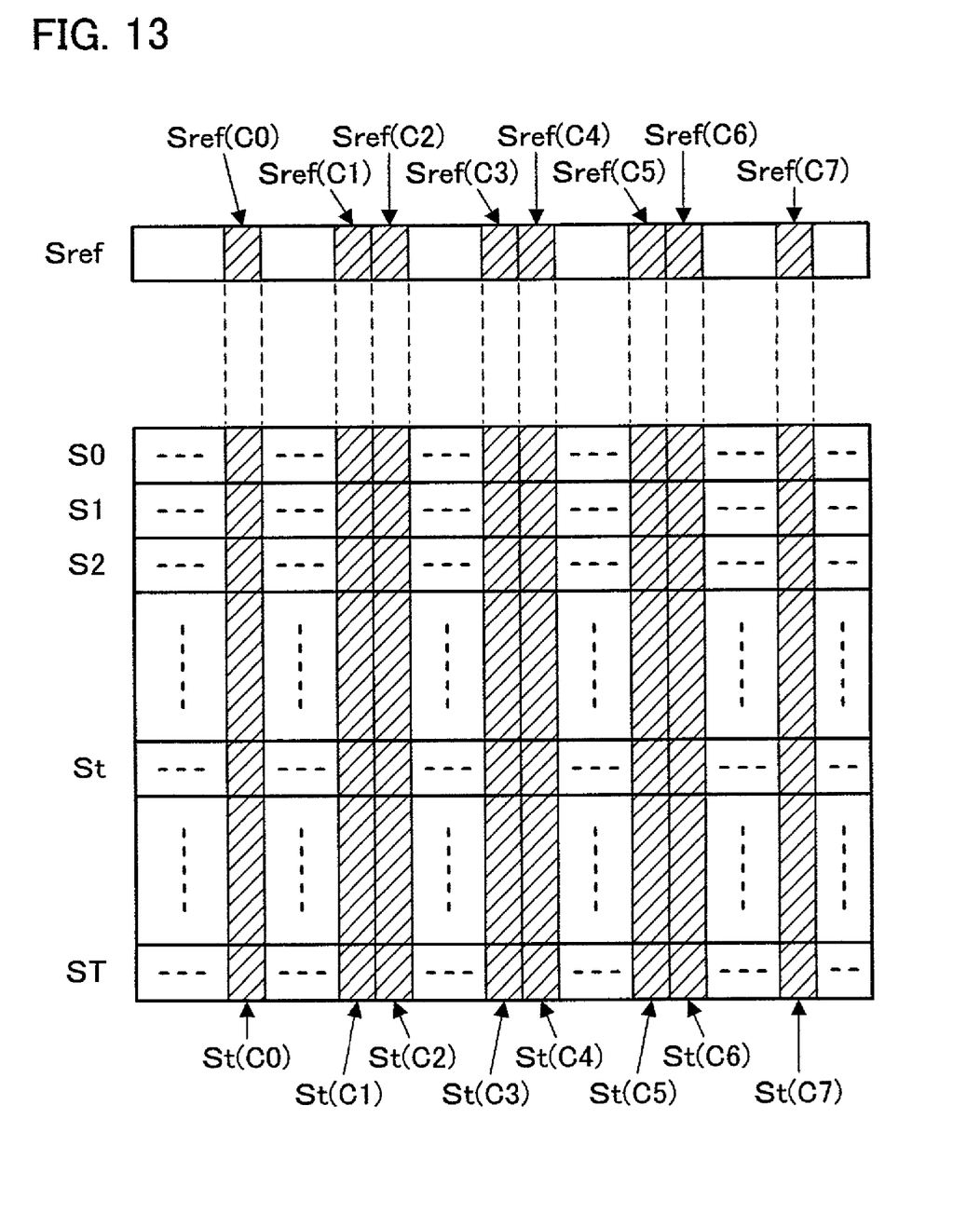
FIG. 13 is an illustrative view showing a state when luminance data are compared between the reference image and another image.

When the SET key 378 is pressed in a display state shown in FIG. 12, the CPU 34 starts search processing. Specifically, the CPU 34 sets (specifically, stores in a memory of its own not shown) the luminance data St of the whole area of the reference image 248 as reference luminance data Sref, and compares data Sref (C0) to Sref (C7) corresponding to the search area 256 among the reference luminance data Sref with the luminance data St (C0) to St (C7) corresponding to the search area 256 of another image file Ft as shown in FIG. 13. Furthermore, the CPU 34 requires a difference (=|Sref (Cm)–St (Cm)|, m: index indicative of a search area number) in each search area 256, and compares the difference ΔSt (Cm) with a predetermined threshold value A.

Figure 14:
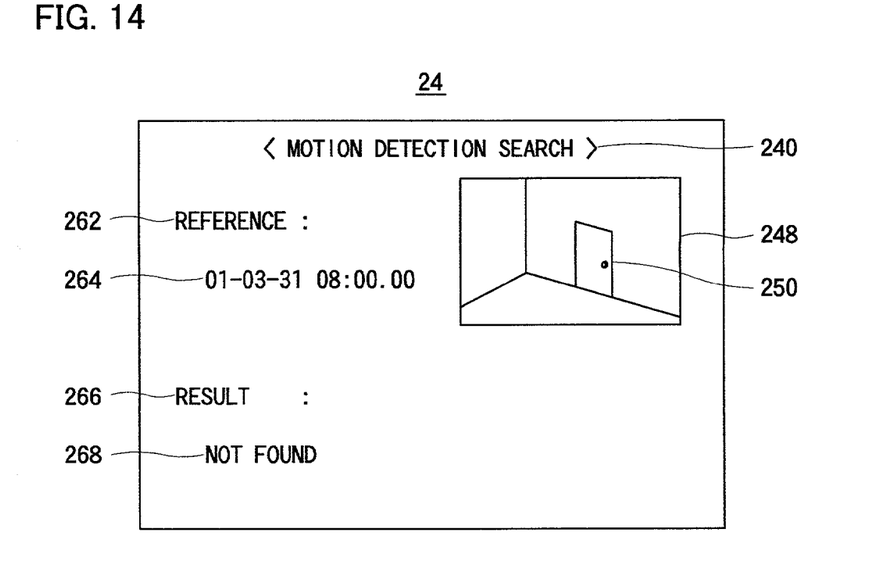
FIG. 14 is an illustrative view showing the display screen of the display when an image satisfying a search condition is not found.

It is noted that the threshold value A is determined depending on the value inputted to the field 260 on the screen shown in FIG. 12. More specifically, the smaller the value inputted to the field 260 is, the smaller the threshold value A is, and the larger the value inputted to the field 260 is, the larger the threshold value A is. When no image file Ft in which the difference ΔSt (Cm) exceeds the threshold value A is found, the CPU 34 displays a screen shown in FIG. 14 on the display 24. Referring to FIG. 14, a character string 262 of "REFERENCE" is displayed at the upper left of the screen, and a character string 264 indicative of the photographed time t (=ref) of the reference image 248 is displayed below the character string 262. The reduced reference image 248 is displayed at the right of the character strings 262 and 264, and a character string 266 of "RESULT" and a character string 268 of "NOT FOUND" are displayed at the lower left of the screen. An operator recognizes that the desired image file Ft is not found by viewing the character string 268 of "NOT FOUND".

Figure 15:
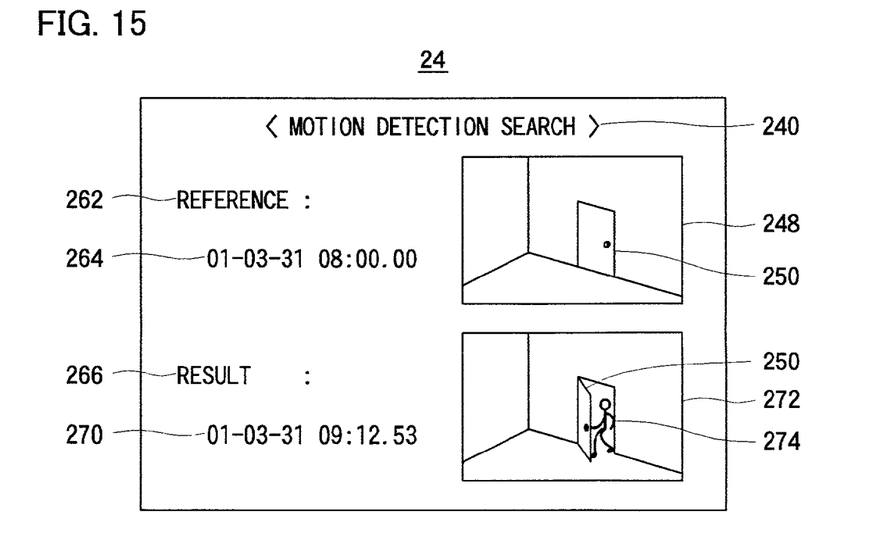
FIG. 15 is an illustrative view showing the display screen of the display when an image satisfying the search condition is found.

On the other hand, when an image file Ft in which the difference ΔSt (Cm) exceeds the threshold value A is found, the CPU 34 displays a screen shown in FIG. 15 on the display 24. Referring to FIG. 15, a character string 270 indicative of a photographed time t of the found image file Ft is displayed in place of the character string 268 of "NOT FOUND" below the character string 266 of "RESULT". A reduced image 272 corresponding to the found image file Ft is displayed at the right of the character strings 266 and 270. Therefore, the operator can recognize an intruder appeared at a time of 01-03-31 09:12.53 from the character string 270 and the reduced image 272.

Figure 16:
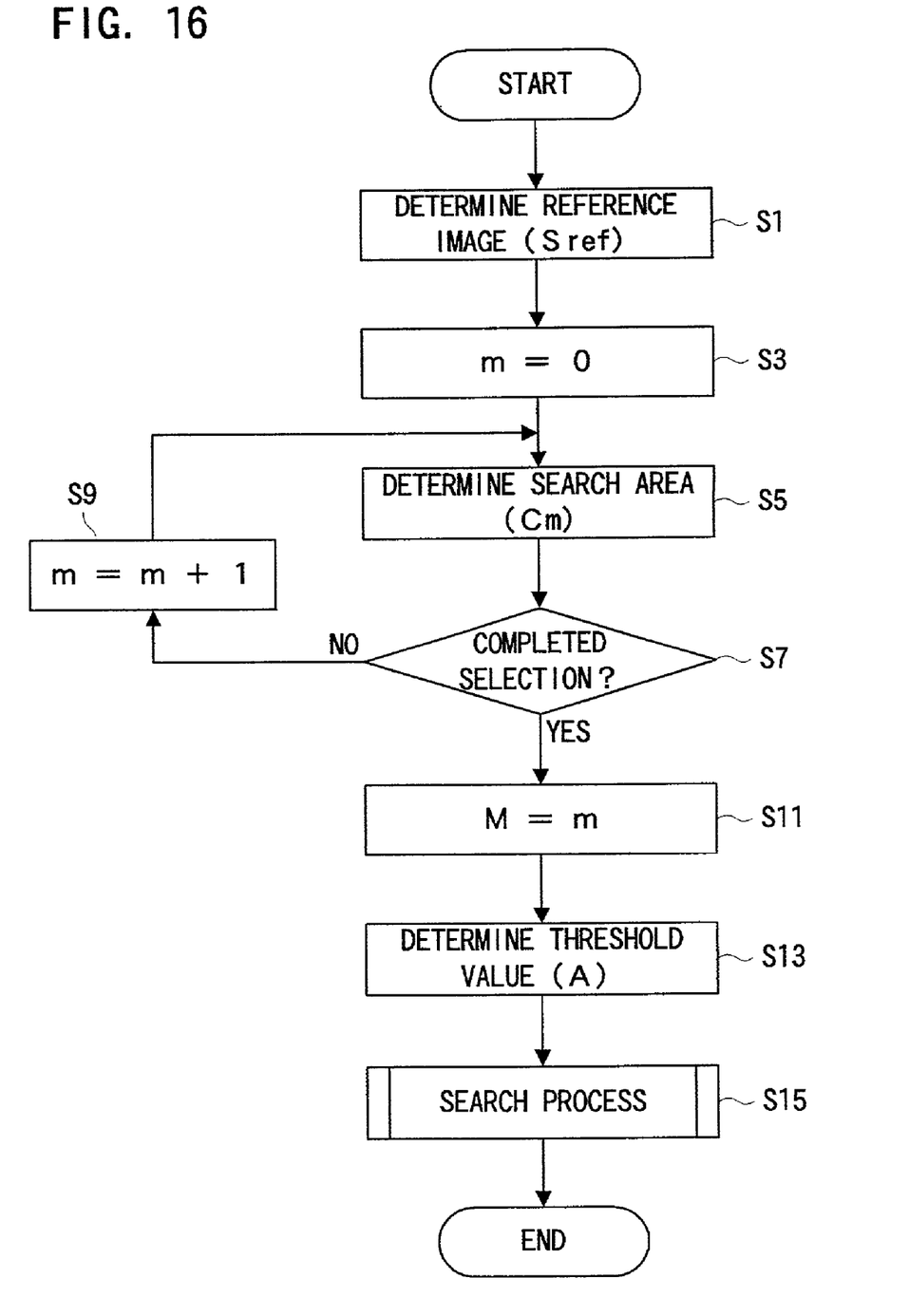
FIG. 16 is a flowchart showing a part of an operation of a CPU.
Figure 17:
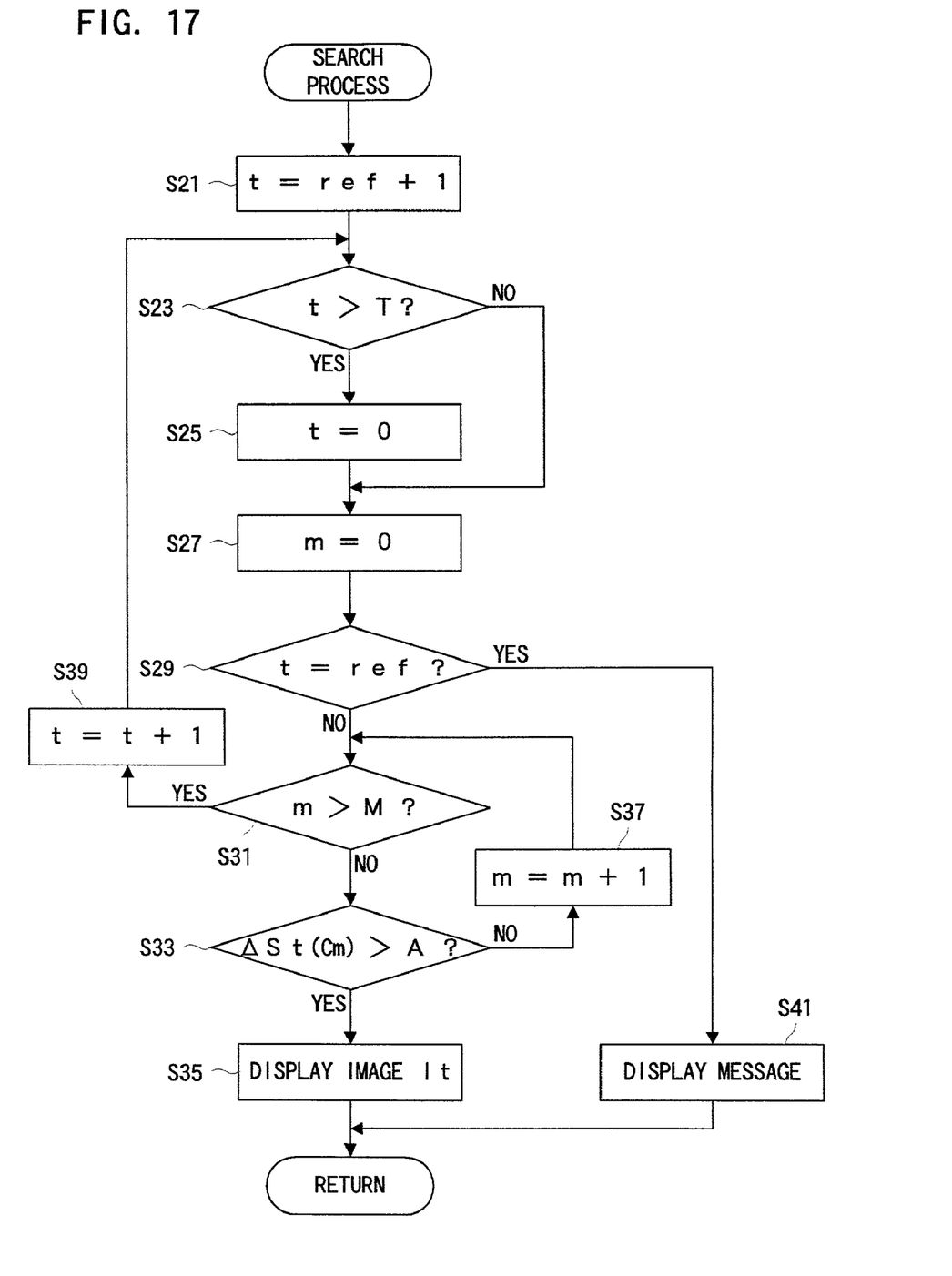
FIG. 17 is a flowchart showing another part of the operation of the CPU.

In such the image search mode, the CPU 34 processes flowcharts shown in FIGS. 16 and 17. It is noted that a control program corresponding to the flowcharts is stored in a ROM 40.

In a step S1 shown in FIG. 16, the reference image 248 is determined and the luminance data St corresponding to the reference data 248 is set as the reference luminance data Sref in response to a key operation of the operator. Successively, the index m of the search area number described above is set to "0" in a step S3, and a search area Cm is determined in response to a key operation by the operator in a step S5. It is determined whether or not the selecting operation of the search area Cm by the operator is completed in a step S7.

The determination is depending on which of the SET key 378 and the EXIT key 380 is pressed in a display state of FIG. 9 (or FIG. 10). Specifically, when the SET key 378 is pressed, it is determined the selecting operation of the search area Cm is continued, and then, the process returns to the step S5 through a renewal of the search area number in a step S9. On the other hand, when the EXIT key 380 is pressed, it is determined the selecting operation of the search area Cm by the operator is completed, and the process proceeds to a step S11.

The index m of a current search area number is set to a maximum value M in the step S11, and the threshold value A is determined in response to a key operation by the operator in a following step S13. In completion of setting the threshold value A, a search process is executed in a step S15.

The search process is executed according to a subroutine shown in FIG. 17. A "ref+1", i.e. the photographed time of the next image of the reference image 248 is set as the index t of the photographed time in a step S21. It is determined whether or not the time t exceeds a maximum value T in a step S23. In a case the time t exceeds the maximum value T (t>T), the time t is set to "0" in a step S25, and then, the process proceeds to a step S27. However, in a case the time t is less than the maximum value T (t≦T), the process directly proceeds to the step S27.

The index m of the search area number is set to "0" in the step S27, and it is determined whether or not the time t is equal to the "ref", i.e. the photographed time of the reference image in a step S29. Herein, if a condition of t=ref is not satisfied, the process proceeds to a step S31, and it is determined whether or not the index m of the search area number exceeds the maximum value M.

In a case the index m dose not exceed the maximum value M (m≦M), the difference ΔS (Cm) of the luminance data is compared with the threshold value A in a step S33. Then, in a case the difference ΔS (Cm) exceeds the threshold value A (ΔS (Cm)>A), the process proceeds to a step S 35, and the screen (image 272) shown in FIG. 15 is displayed on the display 24 on the basis of the image data It corresponding to the time t currently set. In completing the process of the step S35, the process is restored to a hierarchal upper level of a routine.

On the other hand, in a case it is determined that the difference ΔS (Cm) is equal to or lower than the threshold value A (ΔS(Cm)≦A) in the step S33, a renewal process of the index m is executed in a step S37, and then, the process returns to the step S31. In a case it is determined the index m exceeds the maximum value M (m>M) in the step S31, a renewal process of the index t is executed in a step S39, then the process returns to the step S23. Furthermore, in a case it is determined the condition of t=ref is satisfied in the step S29, the screen (the character string 268 of "NOT FOUND") shown in FIG. 14 is displayed on the display 24 in a step S41. In completing the process of the step S41, the process is restored to the hierarchal upper level of the routine.

As understood from the above description, in searching the desired image, the luminance data Sref (Cm) corresponding to the search area Cm of the reference image 248 and the luminance data St (Cm) corresponding to the search area Cm of another image are compared with each other. Herein, the reference image 248 and the search area Cm can be arbitrarily selected. Furthermore, the threshold value A which is compared to the difference ΔSt (Cm) can be arbitrarily determined. Thus, since it is possible to arbitrarily determine a condition in the image search, the desired image can be searched surely and easily.

It is noted although the image search apparatus 12 is applied to the surveillance camera system 10 in this embodiment, it is needless to say that the image search apparatus 12 can be applied to other than the image search system 10.

Furthermore, although the hard disk 32 is utilized as a recording destination of the surveillance image (image file Ft) in this embodiment, another storing medium such as a rewritable DVD (Digital Versatile Disc), a CD (Compact Disc) and etc. may be utilized in place of the hard disk 32.

Furthermore, although the JPEG format is utilized for compressing the image data It in this embodiment, another compression format such as GIF (Graphics Interchange Format), PNG (Portable Network Graphics), MPEG (Motion Picture Expert Group), and etc. may be utilized. However, since the MPEG format adopts a GOP structure in which plurality screens of image data It are grouped, in a case the MPEG format is utilized in the present invention, there is a need to form the luminance data St by a GOP unit. It is noted that the image data It may be recorded on the hard disk 32 in an incompressible state.

In addition, in the present invention, although the luminance data St is written to the application marker segment of the image file Ft, as long as a parallelism between the image data It and the luminance data St is retained, the image data It and the luminance data St may be recorded on different areas of the same recording medium or on separate recording mediums.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image search apparatus, comprising:
   a fetcher for repeatedly fetching an object scene image photographed by a camera;
   a dividing/detecting processor for dividing each of the object scene images fetched by said fetcher into a plurality of areas so as to detect a plurality of luminance-related components respectively corresponding to said plurality of areas;
   an assigner for assigning to a noticed object scene image the plurality of luminance-related components detected from the noticed object scene image by said dividing/detecting processor;
   a recorder for recording the object scene images to each of which the plurality of luminance-related components are assigned by said assigner;
   a first acceptor for accepting a designating operation for arbitrarily designating at least one of said plurality of areas as a search area; and
   a searcher for searching a specific object scene image in which a specific luminance-related component(s) corresponding to the search area designated by the designating operation satisfies a predetermined condition, from among the object scene images recorded by said recorder.

2. An image search apparatus according to claim 1, wherein the predetermined condition is a condition that a difference with the specific luminance-related component(s) of a reference object scene image exceeds a threshold value.

3. An image search apparatus according to claim 2, further comprising a second acceptor for accepting a setting operation for setting the threshold value.

4. An image search apparatus according to claim 2, further comprising a third acceptor for accepting a selecting operation for selecting the reference object scene image from among the object scene images fetched by said fetcher.

5. A surveillance system provided with an image search apparatus according to any one of claims 1 to 4.

* * * * *